United States Patent [19]

Kaar

[11] Patent Number: 4,757,036
[45] Date of Patent: Jul. 12, 1988

[54] MICROCRYSTALLINE TRANSITION METAL OXIDE SPINEL ARTICLES

[75] Inventor: David R. Kaar; Harold G. Sowman; both of St. Paul, Minn.

[73] Assignee: Minnesota Mining and Manufacturing Company, St. Paul, Minn.

[21] Appl. No.: 97,369

[22] Filed: Sep. 14, 1987

Related U.S. Application Data

[63] Continuation-in-part of Ser. No. 809,066, Dec. 13, 1985, abandoned.

[51] Int. Cl.$^4$ ............... C04B 35/44; C03C 10/02; B01J 13/00
[52] U.S. Cl. ............... 501/95; 501/10; 501/12; 501/32; 501/153; 423/594; 423/600; 252/315.01; 252/315.7; 523/442; 523/458; 523/515; 524/413; 524/435; 75/229; 264/DIG. 19
[58] Field of Search ............... 501/10, 12, 32, 35, 501/95, 153; 423/594, 600; 252/315.01, 315.7; 523/442, 458, 515; 524/413, 435; 75/229; 264/DIG. 19

[56] References Cited

U.S. PATENT DOCUMENTS

| | | | |
|---|---|---|---|
| 2,968,622 | 1/1961 | Whitehurst | 252/62.5 |
| 3,082,051 | 3/1963 | Wainer et al. | 501/95 X |
| 3,322,865 | 5/1967 | Blaze et al. | 264/0.5 |
| 3,385,915 | 5/1968 | Hamling | 501/95 X |
| 3,652,749 | 3/1972 | Sobel et al. | 501/95 X |
| 3,704,147 | 11/1972 | Hardy et al. | 501/95 X |
| 3,795,524 | 3/1974 | Sowman | 501/950 R |
| 3,962,514 | 6/1976 | Rittler | 501/7 X |
| 4,261,862 | 4/1981 | Kinoshita et al. | 502/304 O |
| 4,274,981 | 6/1981 | Suzuki et al. | 502/200 X |
| 4,394,455 | 7/1983 | Bertelsman et al. | 501/117 |
| 4,400,431 | 8/1983 | Henslee et al. | 428/402 |
| 4,532,121 | 7/1985 | Bachelard et al. | 423/600 |

FOREIGN PATENT DOCUMENTS 1402544 8/1975 United Kingdom .

OTHER PUBLICATIONS

Oxide Ceramics, Chapter 3, Ryshketwitch, Academic Press, NY 1960.

Primary Examiner—William R. Dixon, Jr.
Assistant Examiner—Karl Group
Attorney, Agent, or Firm—Donald M. Sell; James A. Smith; Lorraine R. Sherman

[57] ABSTRACT

Homogeneous, nonporous ceramic fibers containing at least one magnetically-unaligned, microcrystaline transition metal oxide spinel phase. The ceramic fibers may be used in polymeric, ceramic and metallic composites. Said ceramic spinel is produced by dispersing soluble inorganic and transition metal compounds in an aqueous mixture, concentrating to produce a viscous concentrate, shaping into the desired article, gelling the shaped article, and heating to produce the transition metal spinel article. Beads, bubbles, flakes, microspheres, films and granules may be made as well as fibers.

17 Claims, 1 Drawing Sheet

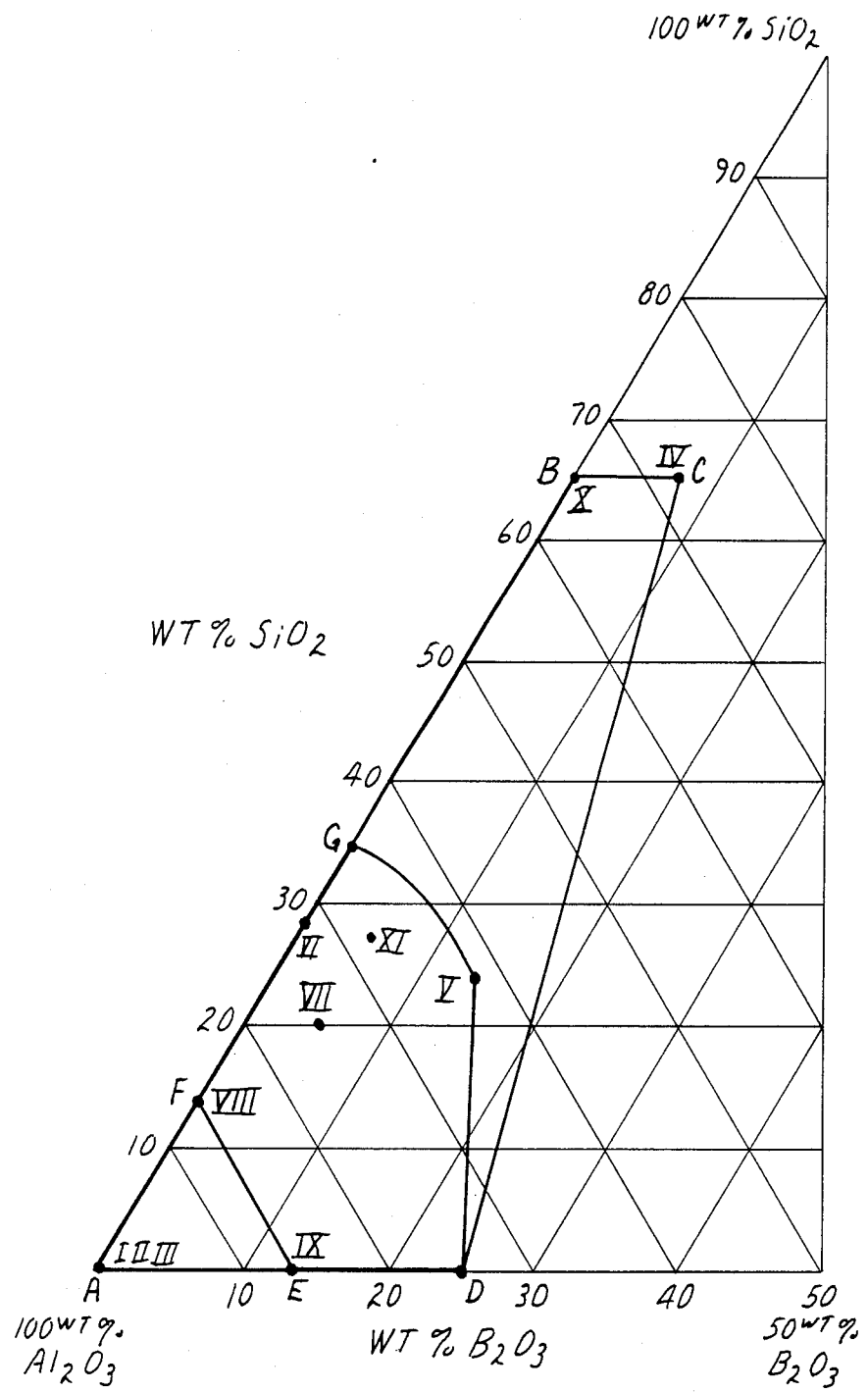

MICROCRYSTALLINE TRANSITION METAL OXIDE SPINEL ARTICLES

This is a continuation-in-part of application Ser. No. 809,066, filed Dec. 13, 1985, now abandoned.

TECHNICAL FIELD

This invention relates to shaped ceramic articles, fired and unfired, and processes therefor, the articles comprising at least one microcrystalline transition metal oxide spinel phase.

BACKGROUND OF THE INVENTION

Spinels represent a class of ceramics represented by the structure $M^1(M^2)_2O_4$ where $M^1$ is a divalent metal cation and $M^2$ is a trivalent metal cation and the oxygen anions form a cubic lattice. The aluminate spinels, having the general formula $M^1Al_2O_4$, where $M^1$ is a divalent metal, typically form from solid state reactions of the constituent oxides at approximately 1000° C. The mineral Spinel, specifically $MgAl_2O_4$, is a naturally-occurring macrocrystalline mineral.

Magnesium aluminate spinels as layered crystallites are described in U.S. Pat. No. 4,400,431.

Oriented magnetic ceramic fibers including nickel ferrite spinels are disclosed in U.S. Pat. No. 2,968,622.

Techniques for preparing spinels are disclosed in U.S. Pat. Nos. 4,394,455 and 4,532,121. For a general reference on spinels see E. Ryshkewitch, "Oxide Ceramics", Academic Press, New York, 1960, Chapter 3, and British Pat. No. 1,402,544.

Aluminate spinels have a variety of uses such as kilnware, refractory structures requiring molten metal slag resistance, ceramic protection tubes and fibers. A method for making polycrystalline refractory fibers, including a magnesium spinel fiber, is disclosed in U.S. Pat. No. 3,322,865. Spinels are also useful for their magnetic properties (e.g., the ferrites), for colorizers, stains, and abrasives. Normal fine grained spinels have grain sizes of 5-10 micrometers.

SUMMARY OF THE INVENTION

Briefly, this invention provides a non-fused ceramic shaped article comprising at least one magnetically-unaligned, microcrystalline, transition metal oxide spinel phase.

The present invention provides a novel ceramic article such as a ceramic fiber or shaped form that has a transition metal oxide spinel as the major constituent (i.e., preferably 30 to 100 weight percent, more preferably 50 to 75 weight percent and most preferably 55 to 60 weight percent). The other constituents (i.e., preferably 70 to 0 weight percent, more preferably 50 to 25, and most preferably 40 to 35 percent by weight) can be other inorganic oxides such as alumina, boria, phosphorus oxide, beryllia, zirconia, titania or other metal oxide which will not interfere with the formation or integrity of the spinel. This invention is believed to be the first to teach transition metal oxide spinel fibers.

The article can be a green (i.e., unfired) ceramic or it can be a fired refractory ceramic material having a microcrystalline, micro-structured spinel phase which preferably is alumina-based which can be made transparent or translucent, and which comprises metal oxides wherein the metals preferably are magnesium or zinc, and preferably transition metal oxides where the metal is chromium, cobalt, iron, and nickel or combinations thereof. The articles can be refractories, such as fibers, beads, bubbles, microspheres, films, flakes, granules, and the like and are useful as reinforcing structures, composites, catalysts, and abrasives materials.

The refractory non-fused ceramic articles of the invention are relatively inexpensive and have desirable physical properties such as high strength, high thermal emissivity, high modulus of elasticity, chemical resistance, and retention of such properties after exposure to high temperatures.

In this application,

"non-fused ceramic" means any inorganic nonmetallic material (includes metal oxides) which requires the application of high temperatures at some stage in its manufacture but is not derived from a melt of the oxide composition, but is derived by a sintering process;

"transition metal oxide spinel" or "transition metal spinel" means a ceramic having the general formula $M^1(M^2)_2O_4$ where $M^1$ is a divalent cation of a transition metal such as cobalt, iron, and nickel, or combinations thereof, and $M^2$ is typically a trivalent metal cation, usually aluminum but sometimes iron (for example ferrites) or chromium, or combinations thereof. The resultant spinel has typically a cubic, or nearly cubic structure. When $M^2$ is aluminum, the anion $(M^2)_2O_4^{-2}$ is referred to as the aluminate anion and the spinel arising therefrom is referred to as an aluminate spinel;

"phase" means a component that exists as distinct and separate portions distributed throughout a heterogeneous system;

"crystalline phase" means a phase which gives a discernible X-ray powder diffraction pattern. A microcrystalline material is also called a crystallite. Many microcrystalline ceramics are transparent or translucent. Crystallite size will affect the line width of the X-ray diffraction pattern. The smaller the crystallite size (below approximate 1 micron), the broader the lines will become. This affects the resolution of the X-ray pattern: fine features such as lines of weak intensity or the ability to separate closely-spaced lines may be lost. An overall pattern remains however and is indicative of the crystal structure;

"microcrystalline" means a crystalline phase having a crystallite size of 50 Å to 1000 Å ($5 \times 10^{-9}$ to $1 \times 10^{-7}$ m), and sometimes larger but always less than 10,000 Å ($1 \times 10^{-6}$ m). Such a microcrystalline structure may be transparent to visible light, providing the material itself is not opaque and does not contain large pores or opaque fillers and the like.

"magnetically unaligned" means magnetic moments of crystallites in a phase have no predominant orientation;

"microstructure" means the internal structure, that is, the structure of grain boundaries, the size, shape, and orientation of grains, as well as the phases and their morphology. Microstructural details usually require magnification to be observed;

"refractory" means maintains its integrity or usefulness at temperatures in the range of 820° to 1400° C.;

"green" refers to ceramic articles which are unfired, untreated or incompletely treated, that is, not in their final ceramic form;

"dehydrative gelling" or "evaporative gelling" mean that sufficient water and volatile material are removed from the shaped green article so that the form or shape of the article is sufficiently rigid to permit handling or processing without significant loss or distortion of the desired articles' form or shape;

"amorphous" means a material having a diffuse X-ray diffraction pattern without definite lines to indicate the presence of a crystalline component;

"transparent" means that the material, when viewed under an optical microscope, (e.g., with a stereoscopic microscope at 50X and under oblique or transmitted light,) has the property of transmitting rays of visible light so that images of article viewed through the material have sharp edges;

"translucent" means that the material, when similarly viewed, has the property of transmitting visible light to some degree so that images have unclear or blurred edges;

"opaque" means that the material, when similarly viewed, has the property of being impervious to visible light;

(Sometimes because of vagaries in firing, an article may be a mixture of these above various types (i.e., transparent, translucent, and opaque), though generally, one will be present in a predominant amount, indicative of the true nature of the mixture, the other products present in minor amounts having their particular appearance due to incomplete firing at the desired temperature or due to overheating because of hot spots in the furnace.)

"sol" means a colloidal dispersion of a finely divided solid phase in a liquid medium;

"fiberization" means the process of forming fibers from a viscous concentrate.

The novel shaped ceramic articles of the invention comprise a transition metal spinel and optionally at least one non-spinel oxide such as alumina, boria, silica, and other ceramic oxides well known in the ceramic arts. These articles are made under non-fusing conditions, i.e., without melting or fusing the constituent oxides, and at temperatures below those commonly used under sintering conditions for these same compositions. When an excess of constituent oxides is present beyond those necessary for the stoichiometric spinel composition, there is then provided the spinel composition plus an additional oxide phase.

Refractories of this invention have properties which make them useful in many environments. For example, in the case of fibers, they may be exposed to high temperatures (e.g., 800° to 1500° C., preferably 1000° to 1500° C.) and maintain their integrity, i.e., they can remain strong, flexible, and continuous. Fibers can be subjected to ordinary textile processing to produce multi-filament textile structures such as rovings, cords, yarns, and the like, and can be worked into non-woven, woven, and knitted fabrics by conventional techniques.

DESCRIPTION OF THE DRAWING

The accompanying Drawing represents a portion of a ternary phase diagram which is the basal plane of a quaternary phase diagram (represented by a tetragonal pyramid in 3 dimensions). The four components of the quaternary field are alumina, boria, silica, and at least one transition metal oxide. The compositions are projected on the basal plane on which the three components: alumina, boria, and silica are represented. The compositions are described in the diagram such that the sum of these three components is 100 percent. Complete compositions are given in the detailed examples.

Referring to the Drawing, the refractory transition metal spinel compositions of this invention fall within the area or along the boundary defined by the curve ABCD, and have compositions within the range in percents by weight of 28 to 100% alumina, 0 to 25.5% boria, and 0 to 65% silica, and (not depicted in the drawing) 4 to 42% metal oxides in the spinel form, wherein the metals are Ni, Fe, Co, and combinations thereof.

Preferred refractory spinel compositions of this invention fall within the area or boundary defined by the curve DEFG in the Drawing and have compositions within the range in percents by weight of 62 to 87% of alumina, 0 to 25.5% of boria, and 0 to 35% of silica, and 10 to 24% transition metal oxides, wherein the metals are as stated above. The points designated I through XI represent ceramic fiber compositions shown in the corresponding examples numbered 1 through 11.

TABLE I below reports the weight percent alumina, boria, and silica for points A through G on the corresponding ternary plane of a quaternary phase diagram of the Drawing.

TABLE I

|   | Alumina | Boria | Silica |
| --- | --- | --- | --- |
| A | 100 | 0 | 0 |
| B | 35 | 0 | 65 |
| C | 28 | 7 | 65 |
| D | 74.5 | 25.5 | 0 |
| E | 87 | 13 | 0 |
| F | 87 | 0 | 13 |
| G | 65 | 0 | 35 |

TABLE II below reports the weight percent alumina, boria, silica, and nickel oxide for compositions A thru G as they describe the maximum spinel content in the four component field which would be represented by a tetrahedral volume in three dimensional space (see, for example, Introduction To Phase Equilibria In Ceramic Systems, American Ceramic Society, 1984, Chapter 8). The figure given for maximum percent spinel which can be formed assumes complete reaction of all NiO and alumina present.

TABLE II

|   | Alumina | Boria | Silica | Nickel Oxide | Spinel Phase* |
| --- | --- | --- | --- | --- | --- |
| A | 58 | 0 | 0 | 42 | (100) |
| B | 28 | 0 | 52 | 20 | (48) |
| C | 23 | 6 | 54 | 17 | (40) |
| D | 48 | 17 | 0 | 35 | (83) |
| E | 66 | 10 | 0 | 24 | (90) |
| F | 29 | 0 | 53 | 18 | (47) |
| G | 44 | 0 | 24 | 32 | (76) |

*maximum spinel that can be formed (wt. percent)

DETAILED DESCRIPTION

In a preferred embodiment, this invention provides shaped, fired, refractory articles comprising a microcrystalline, alumina-based, transition metal oxide spinel which preferably are transparent or translucent unless deeply colored. The refractories may also contain amorphous species (included with other constituents mentioned above, and excluding spinel) bringing the overall composition range of 20 to 80 weight percent alumina, 0 to 65 weight percent silica, 0 to 20 weight percent boria, 1 to 45 weight percent nickel oxide, and 1 to 25 weight percent other transition metal oxide or such metal oxide combinations wherein the transition metal can be, for example, cobalt and iron.

Of special interest are nickel oxide-containing alumina compositions which induce and promote the co-formation of other transition metal-aluminate spinels such as nickel-iron aluminate spinels. The refractories contain at least 5 weight percent, preferably 40 to 100 weight percent of microcrystalline material.

The relationship of the crystalline structure of articles of this invention as a function of both the composition and the processing, especially the firing of the resultant greenware, is reported in Table III. In general, as the firing temperature increases the degree of crystallinity increases. Surprisingly, at about 820° C. the nickel aluminate spinel forms.

Mechanical properties of articles of this invention as a function of composition and firing temperatures are shown in the last column of Table III. In general, mechanical strength of the fired fibers increases with firing temperature to an optimum level and then decreases thereafter.

Optical properties (color appearance) of materials described in this invention as a function of composition are also stated in Table III. When fired above the optimum firing temperature the fibers become less transparent.

Compositions of this invention are based on an alumina transition metal spinel phase ($M^1Al_2O_4$) with optional boria, silica, and other metal oxide additions in another phase. Excess transition metal oxides ($M^1O$) cannot be generally tolerated while excess $Al_2O_3$ is acceptable. Thus there is an upper limit on the amount of spinel-forming oxide which can be accommodated. This limit is a function of the amount of $Al_2O_3$ in a given composition; for example when $M^1$ is Ni, the optimum maximum amount of NiO which can be accommodated is that which produces stoichiometric $NiAl_2O_4$. For an underlying oxide composition of mole ratio 3 $Al_2O_3$.1-$B_2O_3$.2$SiO_2$, that is approximately 24% by weight of the total composition of NiO; however, a particularly useful range is 15 to 30 weight percent NiO. The maximum addition of NiO produces the maximum amount of spinel and properties more like those of the spinel. Correspondingly, less NiO can be used to produce a lower value of the specific property sought, e.g., modulus, density, and the like. When $Fe_2O_3$ is added to the composition with NiO, the spinel formed is (NiFe)(FeAl)-$_2O_4$, because iron is capable of substituting for either type of cation in the spinel structure. Thus the total transition metal oxides which can be incorporated in the spinel phase is up to 40% by weight, preferably 2 to 40 weight percent, most preferably 10 to 24 weight percent.

Refractory articles of this invention are solid, shaped, fired, and non-vitreous, and are made by a non-melt process comprising the steps of providing an aqueous liquid mixture containing transition and other metal compounds such as soluble salts, oxides, sols, or dispersible colloids, or mixtures thereof, concentrating the mixture to a viscous fluid, shaping the viscous concentrate into a desired form, for example a fiber form as is taught in U.S. Pat. No. 4,047,965, and dehydratively or evaporatively gelling the concentrate which results in a "green" (i.e. unfired) or non-refractory amorphous article. In making continuous fibers, the viscous concentrate can be extruded through a plurality of orifices. Alternatively, more dilute or unconcentrated precursors may be formed into microspheres as taught in U.S. Pat. Nos. 3,795,524 and 4,166,147, or made into flakes or coated onto substrates. Heating and firing the shaped green article removes water, decomposes and volatilizes organic constituents (fugitives), and converts the resultant form into a refractory article. All the water in the shaped article need not be removed. Thus, gelling can result from partial dehydration. Chemical gelation is also useful. Shaped articles in their green form are generally transparent to visible light and clear (or perhaps slightly hazy) under an optical microscope, provided they do not contain opacifying materials.

Salts and inorganic oxides used in preparing aqueous mixtures of solutions, sols, or solutions and sols for making the ceramic spinels of this invention are well known in the art and are commercially available from numerous sources. Specific sources are indicated in the appropriate examples below.

Generally, the use of salts having anions which are decomposed thermally in a controlled manner is preferable in the practice of this invention. Simple organic anions (e.g., acetate, formate) are preferred over inorganic anions (e.g., sulfate, nitrate). However, excessive organic anions may cause firing problems. Therefore, it is preferable that part of the mixture composition be introduced as a sol, since this helps to minimize the amount of decomposable fugitive. Using a sol of dispersed metal oxide colloids also imparts strength to the green material.

Most divalent transition metals will, under the proper firing conditions, react with suitable aluminum compounds to form spinels. Usually these conditions require 1000° C. or higher. In the teachings of this invention however, surprisingly, nickel aluminate spinel is formed at about 820° C., appreciably lower than that taught in the background art. A preferred temperature range is 820° C. to 1000° C. to fully develop the desired properties of the refractory article. Also surprising, we have found that not only do nickel aluminate spinels form readily, but the presence of nickel induces and promotes the formation of other transition metal-aluminate spinels, such as nickel-iron aluminate spinels, whereas for example when iron alone is added to alumina, iron tends to form a mixed oxide with alumina rather than form a spinel.

Concentration of the mixture for article formation can be carried out by techniques known in the art (see U.S. Pat. No. 3,795,524 and related art cited therein). For example, the mixture can be concentrated in a rotary evaporator flask under water-aspirator vacuum, the vacuum adjusted to prevent or minimize frothing or loss of the sol. Sufficient concentration, when fibers are prepared, will be obtained when the equivalent solids content of a calcined sample is generally 25 to 55 weight percent, and the viscosity (Brookfield at ambient temperature) of the concentrate is in the range of 15 Pa.S to 1,000 Pa.S, preferably 25 to 500 Pa.S. (Pa.S=1,000 centipoise or cps).

The viscous concentrate can contain various other water-soluble transition metal compounds which will impart additional desired properties to the refractory articles, upon being converted or oxidized to the corresponding alumina spinel. Chromium formate or acetate will impart a green color to the greenware whereas chromium trioxide will impact an orange color; cobalt acetate or nitrate will impart a blue or lavender color; iron nitrate will impart a gold or brown color; and nickel acetate or nitrate will impart a blue green to gold color. In general, any suitable water-soluble transition metal compound such as the soluble nitrates, formates, acetates, citrates, lactates, tartrates, oxalates and the like may be used, provided they do not induce any precipitate formation when introduced into the dilute solution. On concentration of the dilute solution, particularly in the preparation of fibers, care must be taken not to form a visible precipitate as the solubility limits of the constituent salts may be exceeded; however, as the solution is concentrated, the viscosity of the concentrate will increase and thus stabilize the concentrate.

Viscous concentrates are relatively stable but low temperature storage or refrigeration may be preferred if the concentrate is not to be used shortly after preparation, e.g., within one day.

Organic fugitives such as corn syrup or polyvinylpyrrolidone may be added to promote fiberization (via extrusion). Acids may be required in such solutions to stabilize them against crystallization. Organic materials are not required but are generally included in the precursor sol to stabilize the sol and assist in the rheology control of the system.

Refractory articles can be prepared by using the shaping and dehydrative gelling techniques and equipment of the prior art (e.g., see U.S. Pat. Nos. 3,329,745, 3,331,783, 3,331,785, 3,340,567, and 3,380,783). This type of dehydrative gelling can be considered in a sense as a solvent extraction. Chemical gelation can also be useful. Further details on the shaping of articles from the viscous concentrate will be omitted here in the interest of brevity since such shaping procedures are well known and referenced in the text "Modern Composite Materials" (Brautman and Krock, ed., Chapter 8, Addison-Wesley Pub. Co., Reading, Mass.)(1967).

After forming the desired shape (e.g. fiber, bead, bubble, flake, microsphere (solid or hollow) etc.) it is later necessary to heat and fire the greenware to remove all fugitives and to convert the greenware to refractory articles of this invention.

The firing step volatilizes the balance of water and anion components, decomposes and volatilizes organic material, and removes carbon to leave refractory articles. This firing step also causes some shrinking; however, the shape of the article during firing remains intact.

Shaping and firing to provide refractory articles of this invention can be accomplished as disclosed in U.S. Pat. No. 4,125,406 wherein it is taught that there is extruded in air a viscous concentrate of a mixture of solutions, sols, or sols and solutions and then heating and firing the resulting "green" forms at temperatures in the range of 500° to 1500° C. to give uniform shaped, strong, flexible, smooth, glossy refractory materials. Refractory articles of this invention find use in reinforcing structures and composites, active agents in thermal control systems, catalysts and abrasive products. They can be made in an amorphous form by heating, for example, to a temperature in the range of about 500° C. to less than 820° C. Such amorphous articles can be further heated to higher temperatures to densify, strengthen, and convert to a homogeneous mixture of amorphous and crystalline spinel phases or into an all crystalline spinel form with retention of desired shape, integrity, and transparency.

The refractory material or product of this invention is generally useful where high temperature stability or refractoriness is desired or required, for example, up to 820° C. or even 1400° C. or higher, preferably 1000° to 1400° C., depending upon the particular refractory used and the length of service at such high temperatures. It should be noted that above such temperatures, i.e., above 1400° C., microstructure changes such as crystal growth occurs, and the refractory products of this invention generally will begin to lose strength and flexibility, coincident with the extent and growth of the spinels into larger crystallites. The resultant changes are deleterious to the mechanical properties, especially strength and flexibility.

In firing the green articles of this invention, ignition of combustible and organic fugitive materials should be avoided since such ignition may cause a rapid rise in temperature or a catastrophic evolution of volatiles, resulting in the formation of opaque, fragile materials. Ignition may be avoided, for example, by starting out at a low temperature, such as room temperature, and elevating the temperature at a controlled rate to some intermediate temperature which is maintained for a certain length of time before the ultimate firing temperature is achieved. If the greenware is not to be fired completely in one operation or not to be fired immediately or soon after its formation, it may be desirable or necessary for storage in a relatively dry or protective atmosphere to prevent the greenware from picking up moisture or contaminants, and deteriorating or sticking together.

Rather than firing the greenware to remove water and organic material, greenware can be heated in an autoclave in an inert atmosphere (e.g. nitrogen, helium, argon) at 300° to 500° C. to form porous refractories. They can then be fired in aid to remove residual fugitives such as carbon, at 500° C. Increasing the temperature up to about 900° C. converts the porous refractories into a spinel essentially free of carbon.

Articles of the present invention can have varied properties. They may be transparent, translucent, or opaque, depending upon the composition and the temperature at which they are fired Compositions which have a higher transition metal content tend to be more deeply colored. Also, firing the articles at temperatures somewhat above 800° C. tends to convert the composition to a predominently microcrystalline form (see TABLE III). The resulting microcrystallites detected by X-ray diffraction are estimated to be between 500–1000 A .

X-ray data reported are those obtained at room temperature with a Picker X-ray (Picker Corp., Cleveland, Ohio) diffraction instrument, 816 A, at 40 kv, 30 ma, using a powder diffraction camera (Debye-Sherrer) with an effective film diameter of 14.32 cm. Typically, the samples were powdered samples exposed 0.5 hour to copper K alpha radiation wavelength 1.5405 Angstroms, one-half of the film in the camera being filtered through a nickel filter. Where crystallite sizes are given in Angstroms (A), they are estimated average sizes, based on X-ray powder diffraction line broadening.

Transparency exhibited by both the greenware and the fired articles (e.g., fibers, beads and the like) is an indication of uniformity of quality, absence of large pores, smooth surface characteristics, and for the fired articles, small crystallite sizes.

Articles of this invention have been found to be generally non-porous which is consistent with increased strength. This lack of porosity has been observed by surface area measurements and optical microscopy. Surface areas measurements are determined by a nitrogen absorption technique using a Quantasorb TM, model SW-6, surface area measuring instrument (commercially available from Quantachrome Corp., Syosset, N.Y.). The non-porous fibers of the invention have a surface area of less than 1 $m^2/g$. For example, the fibers of Examples 1 to 6, below, having final firing temperatures and have firing times as indicated in TABLE A, below, had surface areas in the range of 0.15 to 0.25 m²/g. These fiber samples were viewed under a scanning electron microscope, magnification 10,000×, and an optical microscope, magnification 400×. No voids were visible in any of the samples.

TABLE A

| Example | Final Firing Temp. (approx.) | Firing Time (approx.) | Surface Area (m²/g) |
|---|---|---|---|
| 1 | 900 C. | 20 hours | 0.25 |
| 2 | 900 C. | 10 hours | 0.15 |
| 3 | 950 C. | 6.25 hours | 0.15 |
| 4 | 900 C. | 11.85 hours | 0.20 |
| 5 | 950 C. | 11.85 hours | 0.15 |
| 6 | 950 C. | 13 hours | 0.20 |

As noted above, incorporation of transition metals in the ceramic fiber composition deeply colors the fibers. Such incorporation also increases the thermal emissivity of structures produced from them. This control of thermal emissivity is very useful in design and development of thermal control structures and systems such as heat-shielding, reflecting-retaining, or insulating curtains and curtains for heat-treating furnaces, lightweight acoustical and thermal insulation for high temperature equipment, such as heating mantles and thermal curtains, Space Shuttle tile and the like (see U.S. Pat. No. 4,148,962).

Refractory products of this invention can be employed alone, in various applications in the form in which they are obtained as fired, or their physical form can be modified, e.g., comminuted or pulverized to form a powder, or in their form as prepared or as modified they can be mixed or coated with or bonded to other materials, e.g., composite matrix materials.

In their porous form, refractory articles are useful in filtering or adsorption applications, for example as filters to remove solids from hot gases, as a chromatographic column packing to selectively separate or resolve liquids or gases, or as catalysts or catalyst supports.

Spinel articles in the form of fibers are flexible, strong, and are durable or fracture resistant. Fibers or yarns of this invention of different colors and/or composition can be used together in making fabrics with decorative designs. Fibers or yarns of this invention can be plied, woven, or interwoven with fibers of other materials, such as metal fibers, silica fibers, carbon, graphite, Teflon TM or fiberglass, and felted, knitted, and braided if desired. Such textiles generally will have the same properties, such as high strength, flexibility, refractoriness, and chemical and fracture resistance, as the fibers from which they are made. Internally colored refractory fibers will find particularly useful application in decorative fabrics, such as used in heat protective clothing, upholstery, wall covering, etc.

Woven cloths made from the refractory fibers can be firmly bonded as wall covering to various substrates. For example, such cloths can be bonded with suitable molten glass or refractory cements such as zircon, aluminum oxide, phosphates, and silicates, to aluminum or other metal substrates and used as the interior walls of airplanes. Woven cloths (or mats) can also be used as lay-ups in plastic, metal, or ceramic laminates. Fibers can also be bonded using such refractory cements as well as colloidal silica, to form flexible ceramic papers or mats useful as thermal insulation or performs for reinforced resin composites.

Refractory spinels of this invention can also be used as reinforcement for ceramic composites, such as silica, glass, aluminum silicate, and other inorganic materials, such reinforced ceramics being in the form of blocks, paper, and other shaped articles used in high temperature environments. Spinels also have uses as high emissivity materials in thermal control and protection systems.

Another particularly useful application for the refractory products of this invention is that of reinforcement for structural polymeric, elastomeric, metallic, or ceramic composites, especially those composites used in high temperature environments or even hyperthermal environments found in the aerospace industry, for example in ablative applications. As composite reinforcement, refractory products of this invention are preferably used in the form of fibers (either in continuous or staple form), though other particulate forms, such as microspheres, aggregates, powders, and flakes, can be used for such purposes. Matrix materials which can be so reinforced include any of those heretofore used in making such composites, such as those disclosed in the above-cited "Modern Composite Materials" text and "Handbook of Reinforced Plastics," by S. S. Oleesky and J. G. Mohr, Reinhold Pub. Co., New York (1964). Plastics may be either of the thermosetting or thermoplastic types. Representative plastics which can be used include epoxy resins, polyester resins, acetal resins, acrylics, especially methyl methacrylate polymers, amino resins, especially urea-formaldehyde, and melamine-formaldehyde, alkyds, cellulosics, especially ethyl cellulose, cellulose acetate, and cellulose propionate, fluorocarbons, furans, polyurethanes, phenolics, polyamides, polycarbonates, vinyl aromatics, such as styrene, polyolefins, especially polyethylene, and the like.

Spinels of this invention can also be used as abrasion resistant and/or reinforcing agents (especially as fibers or in particulate form) for elastomeric materials, such as rubber, e.g., natural rubber, styrene-butadiene rubber (SBR), acrylonitrile-butadiene rubber (NBR), and neoprene (WRT), for example where such rubbers are used in making passenger car or truck tires.

In the following examples, the viscosities recited are Brookfield viscosities measured at ambient room temperature. Weight percent solids data were obtained by drying and firing a sample of the viscous concentrate in air to about 900° to 1000° C. The calculated chemical compositions of the fibers were based on the oxide equivalents of calcined samples of the oxide precursor materials used in making up the fiberizing starting materials. The firing of green fibers and firing of refractory fibers to higher temperatures were all carried out by firing in air in an electric resistance-heated furnace.

Objects and advantages of this invention are further illustrated by the following examples, but the particular materials and amounts thereof recited in these examples, as well as other conditions and details should not be construed to unduly limit this invention. Unless otherwise stated, all percents are weight percents.

EXAMPLES

A typical procedure for all of the following examples is as follows: A first aqueous aluminum salt solution was obtained or prepared. Silica sols, when used, were then added. Requisite organic solutions were then added. All solutions were suitably stirred.

A second aqeuous solution of a transition metal salt was prepared and used at the stated temperature. The first and second solutions were then mixed and the pH was adjusted by addition of concentrated nitric acid to obtain a resultant solution of pH about 4.5.

This solution was pressure filtered through a Balston AA cartridge filter (Balston, Inc., Lexington, Mass.) in series with a one micrometer Millipore ™ (Millipore Corp., Bedford, Mass.) membrane filter under a gauge pressure of $6.9 \times 10^4 - 1.4 \times 10^5$ Pa (10–20 psig). The concentrated in a rotary evaporator under reduced pressure (water aspirator pressure) for several hours using an external water bath at $30 \pm 2°$ C. until a viscous concentrate was obtained. Its stated viscosity was determined by a model RVT viscosimeter (Brookfield Engineering Laboratory, Inc., Stoughton, Mass.).

The resultant concentrate was extruded under nitrogen pressure at about $3.4 \times 10^5 - 1.4 \times 10^6$ Pa (50–200 psi) through a spinerette having thirty or forty holes of $7.6 \times 10^{-5}$ m (3 mil) diameter to yield fibers which were drawn down upon a take-up drum (16. cm, 6.25 inches or 64 cm, 25 inches respectively in diameter) positioned about 1–2 m (3–6 feet fiber draw length) below the spinerette at a take-up rate of about 0.5–1 m/s (100–200 ft per minute). Sufficient heating lamps, were used (usually one lamp per foot of fiber draw length) to assist in drying the fibers. Samples of the dried fibers were cut from the bundle collected on the take-up drum and placed in a furnace and fired in air at the rates and temperatures indicated. The furnace was maintained at the sampling temperature for 5–30 min. before samples were withdrawn.

The first three examples are examples of fibers having primarily a spinel phase.

EXAMPLE 1

Preparation of Nickel Aluminate Spinel Ceramic Fibers

Nickel acetate tetrahydrate (16.8 g, Matheson, Coleman and Bell, Norwood, Ohio) was dissolved in 60 ml of water at 50° C. and acidified with ten drops of concentrated nitric acid. This solution was added at room temperature to 20 g of aluminum formoacetate (for preparation see Kirk-Othmer, Encyclopedia of Chemical Technology, 3d edition, Vol. 2, 202–204 (1978)) dissolved in 80 ml of water at 70° C. followed by 4 g of 50% (wt/wt) polyvinylpyrrolidone (PVP ™ K30, GAF Corp., NY, N.Y.). This solution was pressure filtered ($6.9 \times 10^4 - 1.4 \times 10^5$ Pa, 10–20 PSI, through a one micrometer Millipore ™ filter (Millipore Corp., Bedford, Mass.). The filtrate was concentrated in a rotary evaporator under reduced pressure of about $96.2 - 99.6 \times 10^3$ Pa (29.5 inches of mercury) for about three hours until a viscous concentrate of viscosity 60 Pa.S (60,000 cps) as measured by a model RVT viscosimeter (Brookfield Engineering Laboratory, Inc. Stoughton, Mass.) was obtained.

This concentrate was extruded under nitrogen pressure (about $3.4 \times 10^5 - 1.4 \times 10^6$ Pa, 50–200 psi) through a spinerette having thirty holes of $7.6 \times 10^{-5}$ m, (3 mil) diameter to yield fibers which were drawn down upon a 0.16 m (6.25 inch) diameter take-up drum positioned 1.22 m (4 feet) below the spinerette at a rate of 0.56–0.66 m/s (110.5–130 ft/min). Heating lamps were positioned along the path of the drawn fibers to dry them.

Five samples of the above dried fibers, cut from the bundle collected on the take-up drum, were fired in air in a furnace at 600°, 700°, 800°, 900° and 1000° C. respectively. The furnace temperature was brought up to about 600° C. over a four hour period to slowly burn out the organic fugitives. Then, the furnace temperature was maintained at the sample firing temperature for 5–15 minutes before samples were withdrawn. The fibers were green in color, strong, transparent, and flexible, even at the higher firing temperatures.

X-ray analyses of the resultant fired fibers indicated that Eta alumina was present in samples fired up to about 800° C., and than nickel aluminate ($NiAl_2O_4$) spinel was present in samples fired at 800° C. and above. A slight amount of nickel oxide (NiO) was detected in samples fired to 900° C. and above.

The nominal composition of these fibers by weight was 58 percent $Al_2O_3$ and 42 percent NiO.

A summary of information such as constituent composition, mechanical properties, appearance, and crystal structure on these fibers is summarized in Table III.

EXAMPLE 2

Preparation of Mixed Nickel-Iron Alumina Spinel Ceramic Fibers

The following three solutions were added successively to a room temperature solution of 21.3 g of aluminum chlorhydrol ($Al(OH)_5Cl \cdot 2H_2O$, Reheis Chemical Company, Division of Armour Pharmaceutical, Phoenix, Ariz.) in 100 ml of water:

12.5 g of nickel acetate tetrahydrate (Matheson, Coleman and Bell, Norword, Ohio) dissolved in 100 ml water at 50° C.

13.5 g of ferric chloride hexahydrate (Fisher Scientific Co., Fairlawn, N.J.) in 50 mL water 12.0 g of 50% (wt/wt) PVP K-30 in water.

As described in Example 1, the resulting solution was filtered, the filtrate was concentrated to a viscosity of 100 Pa.S (100,000 cps), and the concentrate was forced through a spinerette to form fibers.

Four samples of the resultant dried fibers were fired in air in a furnace at 500°, 660°, 800° and 900° C. respectively following the techniques described in Example 1. X-ray analyses indicated that fibers fired to 660° C. were a solid solution having the empirical formula (Al, Ni, Fe)$_2O_3$ in the Eta form and contained a slight amount of nickel aluminate ($NiAl_2O_4$) spinel. Fibers fired at 800° and 900° C. were shown to be a mixed spinel phase having the formula $(NiFe)Al_2O_4$.

The nominal composition of these fibers was 57 percent $Al_2O_3$, 22 percent $Fe_2O_3$ and 21 NiO.

The following examples describe fibers having a spinel phase material with another oxide phase.

EXAMPLE 3

Preparation of Nickel Aluminate Spinel-Alumina-Boria Ceramic Fibers

A first solution was prepared from 101 g of a 7.25 weight % aqueous solution of basic aluminum acetate (available as Niaproof ™, Niacet Corp., Niagara Falls, N.Y.; see U.S. Pat. No. 3,795,524, Example 7) to which was added 4.6 g of lactic acid (J. T. Baker Co., Phillipsburg, N.J.).

A second solution was prepared by dissolving 8.48 g of nickel acetate tetrahydrate in 20 ml of water at about 70° C. to which was added 1.2 g of boric acid (Fisher Scientific Co., Fairlawn, N.J.).

The first and second solutions were combined and 3 g of N,N-dimethylformamide (Matheson, Coleman and Bell, Norwood, Ohio) were added and the resultant solution's pH was about 4.5 to 5.

This solution was filtered, the filtrate was concentrated to a viscosity of 23 Pa.S (23,000 cps.), and spun through a forty hole spinerette according to the general directions given above.

A hank of the resultant fibers was fired according to the following schedule:

room temperature to 430° C. in 36 minutes, 430° to 750° C. in 54 minutes, and held at 750° C. for 18 minutes, and cooled to complete the firing schedule.

Samples taken from the above fired hank were refired according to the following schedule: room temperature to 850° C. in 50 minutes, and 850° to 950° C. in 45 minutes.

Samples removed at 750° C., 850° C., and 950° C. were examined and the results are described in Table III. The nominal composition of these fibers by weight of constituent oxides was 57% $Al_2O_3$; 24% NiO; 19% $B_2O_3$.

EXAMPLE 4

Preparation of Nickel Aluminate Spinel-Alumina-Boria-Silica Ceramic Fibers.

To a first solution of 77.4 g of 7.25 weight % aqueous basic aluminum acetate (see Example 3) was added in succession with adequate mixing 7 g. of lactic acid, 30.3 g. of silica sol (Nalco TM 1034A; 34% silica as an aqueous sol Nalco Chemical Co., Oak Brook, Ill.) and 5 g. of N,N-dimethylformamide.

A second solution was made having 17 g of nickel acetate tetrahydrate dissolved in 30 mL of water at about 60° C. The resultant solution was allowed to cool to about 40° and was added with stirring to the first solution whose resultant pH was about 4.5. This solution was filtered, the filtrate was concentrated to 44 Pa.S (44,000 cps), and the concentrate was spun into fibers using a 30 hole spinerette with a 2.4 m (6 ft.) draw length onto the large diameter wheel according to the given general directions.

A hank of the resultant fibers were fired in a furnace according to the following schedule:

Room temperature to 430° C. in 6 hours and held at this temperature for 1.2 hours, 430° C. to 750° C. in 1.8 hours, held at this temperature for 0.6 hours, then allowed to cool to room temperature within the now turned off furnace.

Two samples were taken from this hank and fired to higher temperatures. One sample was fired from room temperature to 720° C. in one hour and to 850° C. in an additional 1.5 hours, then held at 850° C. for 0.75 hour and allowed to cool to room temperature. Another sample was fired from room temperature to 900° C. in 1.0 to 1.5 hours and held at 900° C. for one hour then allowed to cool.

Each of these three samples, fired to 750° C., 800° C., and 900° C. were examined and the results summarized in Table III.

This fiber had a nominal composition by weight of constituent oxides of 50% $SiO_2$, 21% $Al_2O_3$, 5% $B_2O_3$, and 24% NiO.

EXAMPLE 5

Preparation of Nickel Aluminate Spinel-Alumina-Boria-Silica Ceramic Fibers Similar to Those in Example 5 but Having a Lower Silica Content To a first solution of 167.2 g of 7.25% aqueous basic aluminum acetate (see Example 3) was added in succession with adequate mixing 5.1 g of lactic acid, 11.3 g of silica sol (Nalco 1034A; 34% silica as an aqueous sol, Nalco Chemical Co., Oak Brook, Ill.) and 5.0 g of N,N-dimethylformamide.

A second solution was prepared having 17 g of nickel acetate tetrahydrate dissolved in 45 mL of water at about 60° C. The resultant solution was allowed to cool to about 40° C. and was added with stirring to the first solution whose resultant pH was about 5. It was acidified with about 3 drops of concentrated nitric acid to bring pH down to 4.5. This solution was filtered, the filtrate was concentrated for about 4 hours to about 42 Pa.S (42,000 cps), and the concentrate was spun into fibers using a 40 hole spinerette according to the given general directions. The green fibers had an equivalent oxide content of 33 weight percent.

A hank of the resultant fibers was fired according to the same schedule as stated in Example 4.

The fired examples were examined and the results are reported in Table III. The constituent oxide composition of these fibers was 47% $Al_2O_3$, 24% NiO, 11% $B_2O_3$, and 18% $SiO_2$ nominally by weight.

EXAMPLE 6

Preparation of Nickel Aluminate Spinel-Alumina-Silica Fibers

To a first solution of 37.4 g of aluminum formoacetate (prepared as in Example 1) in 60 mL of water at 75° C. was added 3 g of lactic acid.

A second solution was prepared from 19.8 g of nickel nitrate hexahydrate (Matheson, Coleman and Bell, Norwood, Ohio) in 20 mL of water at room temperature and this was added to 14.6 g. of silica sol (Ludox TM LS, E. I. duPont de Nemours, Wilmington, Del.). This second solution was added with stirring to the first solution and the resultant solution was filtered and concentrated to 48 Pa.S (48,000 cps) and the concentrate spun into fibers using a 30 hole spinerette under $6.9 \times 10^5$ Pa (100 psi) nitrogen according to the general directions. The green fibers were fired as a hank in air to a temperature of 750° C. over 12 hours and then allowed to cool in the furnace. Samples taken from the fired hank were refired to temperatures of 860° C., 900° C. and 950° C.; each held at the respective temperature approximately one hour. The results are summarized in Table III. The nominal composition of these fibers by weight of constituent oxides was 55% $Al_2O_3$, 21% $SiO_2$, and 24% NiO.

EXAMPLE 7

Preparation of Nickel Aluminate Spinel-Alumina-Boria-Silica Ceramic Fibers

To a solution of 29.8 g of 7.25% aqueous basic aluminum acetate (see example 4) was added in succession with adequate mixing: 3.5 g lactic acid, 6.45 g silica sol (Ludox TM LS, duPont) acidified with 1 drop of concentrated nitric acid and 3.0 g dimethylformamide. A second solution of 8.48 g nickel acetate dissolved in 20 ml of 55° C. water was allowed to cool to 40° C. then stirred into the first solution; the resultant solution had a pH of about 4.5. A third solution of 13.8 g aluminum formoacetate (prepared as in Example 1) dispersed in 20 mL deionized water heated to 75° C. and allowed to cool to 40° C. was added to the solution above. The final solution, having a pH of about 4.5, was filtered and the filtrate concentrated for about 3.5 hours to a viscosity of 25 Pa.S (75,000 cps). The concentrate was spun into fibers using a 30 hole spinerette as described in the general directions. The dried spun fibers had an equivalent oxide content of 38%.

The resultant fibers were fired first from room temperature to 750° C. over 12 hours and then refired from room temperature to 850° C. over 3 hours, and finally taken from 860° C. to 900° C. in one hour and brought to 950° C. in one hour.

The fired examples were examined and the results shown in Table III. The nominal composition of fibers in this example by weight of constituent oxides was 57% $Al_2O_3$, 4% $B_2O_3$, 15% $SiO_2$ and 24% NiO.

EXAMPLE 8

Preparation of a Nickel Aluminate Spinel-Alumina-Silica-Ceramic Fiber, Intermediate in Composition Between Examples 2 and 7

A solution of 22.4 g of aluminum formoacetate (prepared as in Example 1) was dispersed in 40 ml of deionized water and heated to between 75° and 80° C. After the solution was cooled to 45° C. and while it was being stirred, the following were added in succession: 3.0 g lactic acid, 3.36 g silica sol (Ludox TM, duPont). 3.0 g dimethylformamide, and a solution of 47 g nickel acetate in 25 mL of deionized water heated to 55° to 60° C. and cooled to 40° C.

The solution was filtered and concentrated to a viscostiy of 26,000 Pa.S and the concentrate spun into fibers using a 76 micrometer diameter (3 mil)×30 hole spinnerette under 6.9×10⁵ Pa (100 psi) nitrogen at 44.5 m/min (146 feet/min) according to the general directions. The green fibers were fired as a hank in air to 430° C. in 6 hours, held at 430° C. for 2 hours then heated to 750° C. in 1.8 hours, held for 0.6 hour and then allowed to cool to room temperature. Samples taken from the fired hank were refired to 850° C. for 0.5 hour, some were removed and the remainder heated further to 900° C. in 0.25 hour. The results are summarized in Table III. The nominal composition of these fibers by weight of constituent oxides was 66% $Al_2O_3$, 10% $SiO_2$, and 24% NiO.

EXAMPLE 9

Preparation of a Nickel Aluminate Spinel-Alumina-Boria Ceramic Fiber, Intermediate in Composition Between Those of Examples 1 and 4

A solution of 7.53 g of aluminum formoacetate (prepared as in Example 1) was dispersed in 20 mL of deionized water and heated to between 75° and 80° C. After the solution cooled to 50° C., it was added to 78.4 g of 7.25% aqueous solution of basic aluminum acetate; to this solution was added in succession: 3.5 g lactic acid, a solution of 8.48 g nickel acetate tetrahydrate dissolved in 20 ml deionized water heated to 70° to 75° C. and allowed to cool to 500° C. 3.0 g dimethylformamide was added under agitation. The final solution had a pH of approximately 4.5.

The solution was filtered and concentrated to a viscosity of 43 Pa.S (43,000 cps) and the concentrate spun into fibers using a 76 micrometer diameter (3 mil)×30 hole spinnerette under 6.9×10⁵ Pa (100 psi) nitrogen at 62.5 m/min (205 L/min) according to the general directions. The green fibers were fired as a hank in air to 450° C. in 12 hours, held at 450° C. for 2.4 hours then heated to 750° C. in 3.6 hours, held for 1.2 hours and then allowed to cool to room temperature. Samples taken from the fired hank were refired to 700° C. in 1 hour, and heated successively to 750° C. in 45 min, to 800° C. in 35 min, and to 850° C. in 30 min. Some samples were removed and the remainder heated further to 900° C. in 15 min and 950° C. in 30 min. The results are summarized in Table III. The nominal composition of these fibers by weight of constituent oxides was 66% $Al_2O_3$, 10% $B_2O_3$ and 24% NiO.

EXAMPLE 10

Preparation of a Nickel Aluminate Spinel-Alumina-Silica Ceramic Fiber

A solution of 19.36 g of aluminum formacetate (prepared as in Example 1) was dispersed in 60 mL of deionized water heated to between 75° and 80° C. After the solution has cooled to 40° C. and while it was being stirred the following were added in succession: 7.0 g lactic acid, 35.65 g silica sol (Ludox LS, DuPont), 6.0 g dimethylformamide, and a solution of 12.72 g nickel acetate in 40 mL of deionized water heated to about 70° C. and cooled to about 40° C. The final solution had a pH of between 4.5 and 5.

The solution was filtered and concentrated to a viscosity of 50 Pa.S (50,000 cps) and the concentrate spun into fibers using a 76 micrometer diameter (3 mil)×30 hole spinnerette under 10.4×10⁵ Pa (150 psi) nitrogen at 30.5 m/min (100 L/min) according to the general directions. The green fibers were fired as a hank in air to 850° C. The results are summarized in Table III. The nominal composition of these fibers by weight of consituent oxides was 29% $Al_2O_3$, 53% $SiO_2$ and 18% NiO.

EXAMPLE 11

Preparation of a Nickel Aluminate Spinel-Alumina-Boria-Silica Ceramic Fiber, Intermediate in Composition Between Examples 5 and 6

A solution of 21.4 g of aluminum formoacetate (prepared as in Example) was dispersed in 50 mL of deionized water heated to 80° C., after cooling to 40° C. it was added to 59.5 g of 7.25% aqueous solution of basic aluminum acetate, producing a solution having a pH between 3.5 and 4. To this was added in succession 6.0 g lactic acid, a solution formed by dissolving 17.0 g nickel acetate in 50 mL of dionized water heated to 50° C. after it had been allowed to cool to 40° C., 12.36 g silica sol (Nalco TM 1034A, 34.3% $SiO_2$) and 6.0 g dimethylformamide. The final solution had a pH of between 4.5 and 5.

The solution was filtered and concentrated to a viscosity of 62 Pa·S (62,000 cps) and the concentrate spun into fibers using a 76 micrometer diameter (3 mil)×40 hole spinerette under 13.8×10⁵ Pa (200 psi) nitrogen at 30 m/min (98 ft/min) according to the general directions. The green fibers were fired as a hank in air to 750° C. and then allowed to cool to room temperature over a 12 hour period. Samples taken from the fired hank were refired to 850° C.; some samples were removed and the remainder heated further to 950° C. The results are summarized in Table III. The nominal composition of these fibers by weight of constituent oxides was 52% $Al_2O_3$, 4% $B_2O_3$, 20% $SiO_2$, and 24% NiO.

TABLE III

Spinels

| Example No. | Firing temp. °C. | Color appearance | Crystal structure | Mechanical properties |
|---|---|---|---|---|
| 1 | 600 | blue | cubic eta $Al_2O_3$ | |
| | 700 | blue | cubic eta $Al_2O_3$ | |
| | 800 | blue | cubic eta $Al_2O_3$ + trace $NiAl_2O_4$ | |
| | 900 | blue | $NiAl_2O_4$ + NiO | |
| | 950 | blue | | |
| | 1000 | blue | $NiAl_2O_4$ + NiO | |
| 2 | 500 | brownish | trace spinel | friable |
| | 660 | brown | mostly spinel $Al_2O_3$ | |
| | 800 | purple brown | (NiFe) $Al_2O_4$ spinel | |
| | 900 | purple brown | (NiFe) $Al_2O_4$ spinel | |
| 3 | 750 | olive green, shiny | *R—Mullite + eta $Al_2O_4$ | fairly strong |
| | 850 | bright olive green, shiny | R—Mullite + $NiAl_2O_4$ + slight eta $Al_2O_3$ | fairly strong |
| | 950 | bright olive green | R—Mullite + $NiAl_2O_4$ + eta $Al_2O_3$ | strong |
| 4 | 750 | olive green, shiny | | soft, fairly strong |
| | 850 | olive green | | friable weaker |
| | 900 | | | friable |
| 5 | 750 | dark green, shiny | eta $Al_2O_3$ + amorphous | very strong |
| | 800 | green & | eta $Al_2O_3$ | |
| | 900 | green & shiny | $NiAl_2O_4$ slight R—Mullite | fairly strong |
| | 950 | green & shiny | $NiAl_2O_4$ + R—Mullite | fairly strong |
| 6 | 750 | olive green + shiny | | |
| | 860 | greenish blue | $NiAl_2O_4$ | strength increases with firing temp |
| | 900 | greenish blue | $NiAl_2O_4$ | |
| | 950 | sky blue | $NiAl_2O_4$ | |
| 7 | 750 | olive green, shiny | $NiAl_2O_4$, weak pattern, incomplete crystallization | very strong |
| | 850 | greenish blue, shiny | $NiAl_2O_4$, crystallized | very strong |
| | 900 | blue, slightly dull | $NiAl_2O_4$, slightly increased lattice parameter with higher firing temperatures | weak, friable |
| 8 | 750 | shiny green, soft | $NiAl_2O_4$ | strong |
| | 850 | shiny blue-green, soft | $NiAl_2O_4$ | strong |
| | 900 | shiny blue, soft | $NiAl_2O_4$ | strong |
| 9 | 750 | green | $NiAl_2O_4^{(100)}$ + R—Mullite$^{(5)}$ | strong |
| | 850 | shiny, bluish green | $NiAl_2O_4^{(100)}$ + R—Mullite$^{(50)}$ | strong |
| | 950 | bright blue green | $NiAl_2O_4^{(100)}$ + R—Mullite$^{(70)}$ | strong |
| 10 | 850 | shiny olive green | $NiAl_2O_4$ | fairly strong filament tensile strength 8.3 × $10^8$ Pa (120,000 psi) |
| | 950 | olive green | $NiAl_2O_4$ | filament tensile strength 8.3 × $10^8$ Pa (120,000 psi) |
| 11 | 750 | glossy avocado green | $NiAl_2O_4$ | fairly strong |
| | 850 | glossy blue green | $NiAl_2O_4$ | strong |
| | 950 | glossy blue green | $NiAl_2O_4$ | fairly strong |

*defined in U.S. Pat. No. 3,795,524

Various modifications and alterations of this invention will become apparent to those skilled in the art without departing from the scope and spirit of this invention, and it should be understood that this invention is not to be unduly limited to the illustrative embodiments set forth herein.

We claim:

1. A ceramic fiber consisting essentially of at least one magnetically-unaligned, microcrystalline, transition metal oxide spinel phase, said fiber being homogeneous and non-porous and having a surfce area of less than 1 m²/g.

2. The ceramic fiber according to claim 1 wherein said transition metal oxide spinel has the formula $M^1(M^2)_2O_4$ wherein $M^1$ is a divalent transition metal ion and $M^2$ is a trivalent metal ion.

3. The ceramic fiber according to claim 2 wherein $M^1$ is at least one of cobalt, iron, or nickel and $M^2$ is at least one of aluminum, iron or chromium.

4. The ceramic fiber according to claim 3 wherein $M^1$ is nickel and $M^2$ is aluminum.

5. The ceramic fiber according to claim 1 comprising in the range of 20 to 80 weight percent $Al_2O_3$, 0 to 65 weight percent $SiO_2$, 0 to 20 weight percent boria, 1 to 45 weight percent NiO, and 1 to 25 weight percent other transition metal oxides or combination of transition metal oxides wherein the metal is cobalt or iron.

6. The ceramic fiber according to claim 1 which is fired.

7. The ceramic fiber according to claim 1 which is transparent.

8. The ceramic fiber according to claim 1 which is made into a fabric, mat, or batting.

9. The ceramic fiber according to claim 1 which is transparent or translucent.

10. A ceramic fiber consisting essentially of at least one magnetically-unaligned, microcrystalline, transition metal oxide spinel phase and at least one inorganic oxide selected from the group consisting of alumina, boria, phosphorus oxide, beryllia, zirconia, titania, silica, and other metal oxide which will not interfere with the formation or integrity of the spinel, said fiber being homogeneous and non-porous and having a surface area of less than 1 m$^2$/g.

11. The ceramic fiber according to claim 10 comprising in the range of 30 to 100 weight percent of said spinel phase and 70 to 0 weight percent of said at least one inorganic oxide.

12. The ceramic fiber according to claim 11 comprising in the range of 50 to 75 weight percent of said spinel phase and 50 to 25 weight percent of said at least one inorganic oxide.

13. A process for making a refractory spinel shaped article comprising the steps:
  a. providing an aqueous mixture containing soluble inorganic and transition metal salts, oxides, sols, dispersible colloids, or mixtures thereof,
  b. concentrating said mixture to a viscous concentrate,
  c. shaping the resulting viscous concentrate into a desired formed article,
  d. dehydratively gelling the formed article to provide a green non-refractory shaped article, and
  e. heating and firing the green shaped article in a temperature range of 820° to 1000° C. to provide said refractory spinel article;

said refractory shaped article being a ceramic bead, bubble, flake, microsphere, film, granule, or continuous fiber consisting essentially of at least one microcrystalline transition metal oxide spinel phase, and said article being homogenous and non-porous.

14. The process according to claim 13 wherein said refractory shaped article further comprises at least one inorganic oxide selected from the group consisting of alumina, boria, phosphorous oxide, beryllia, zirconia, titania, silica, and other metal oxide which will not interfere with the formation or integrity of the spinel.

15. A continuous fiber prepared according to the process of claim 15 and having a surface area of less than 1 m$^2$/g 16. A composite article comprising a polymeric, metallic, or ceramic component and at least one ceramic fiber component, said fiber consisting essentially of at least one magnetically-unaligned, microcrystalline, transition metal oxide spinel phase, said fiber being homogeneous and non-porous and having a surface area of less than 1 m$^2$/g.

17. A composite article comprising a polymeric, metallic, or ceramic component and at least one ceramic fiber component, said fiber consisting essentially of at least one magnetically-unaligned, microcrystalline, transistion metal oxide spinel phase, and at least one inorganic oxide selected from the group consisting of alumina, boria, phosphorus oxide, beryllia, zirconia, titania, silica, and other metal oxide which will not interfere with the formation or integrity of the spinel, said fiber being homogenous and non-porous and having a surface area of less than 1 m$^2$/g.

* * * * *

UNITED STATES PATENT AND TRADEMARK OFFICE
CERTIFICATE OF CORRECTION

PATENT NO. : 4,757,036

DATED : July 12, 1988

INVENTOR(S) : David R. Kaar and Harold G. Sowman

It is certified that error appears in the above-identified patent and that said Letters Patent is hereby corrected as shown below:

Col. 8, line 32, add -- . -- after the word "fired".

Col. 17, line 60, delete "surfce" and insert therefor -- surface --.

Signed and Sealed this

Eighteenth Day of April, 1989

Attest:

DONALD J. QUIGG

Attesting Officer

Commissioner of Patents and Trademarks